United States Patent
Buban et al.

(10) Patent No.: US 7,313,792 B2
(45) Date of Patent: Dec. 25, 2007

(54) METHOD AND SYSTEM FOR SERVICING SOFTWARE

(75) Inventors: Garret J. Buban, Carnation, WA (US); Kory V. Gill, Woodinville, WA (US); Manojkumar Haridas Shende, Redmond, WA (US); James A. Holmes, Sammamish, WA (US); Michael V. Sliger, Sammamish, WA (US); William R. Tipton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/657,392

(22) Filed: Sep. 8, 2003

(65) Prior Publication Data

US 2005/0055686 A1    Mar. 10, 2005

(51) Int. Cl.
G06F 9/445 (2006.01)
(52) U.S. Cl. .................. 717/170; 717/172; 717/178
(58) Field of Classification Search ......... 717/168–178
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 5,577,244 A | * | 11/1996 | Killebrew et al. | 717/169 |
| 5,872,979 A | * | 2/1999 | Edel et al. | 717/170 |
| 6,070,012 A | * | 5/2000 | Eitner et al. | 717/168 |
| 6,161,218 A | * | 12/2000 | Taylor | 717/174 |
| 6,216,140 B1 | * | 4/2001 | Kramer | 715/511 |
| 6,226,747 B1 | * | 5/2001 | Larsson et al. | 726/31 |
| 6,256,773 B1 | * | 7/2001 | Bowman-Amuah | 717/121 |
| 6,327,705 B1 | * | 12/2001 | Larsson et al. | 717/174 |
| 6,353,926 B1 | * | 3/2002 | Parthesarathy et al. | 717/170 |
| 6,367,075 B1 | * | 4/2002 | Kruger et al. | 717/169 |
| 6,425,126 B1 | * | 7/2002 | Branson et al. | 717/168 |
| 6,427,227 B1 | * | 7/2002 | Chamberlain | 717/124 |
| 6,434,744 B1 | * | 8/2002 | Chamberlain et al. | 717/168 |
| 6,484,315 B1 | * | 11/2002 | Ziese | 717/173 |
| 6,526,574 B1 | * | 2/2003 | Jones | 717/168 |
| 6,704,933 B1 | * | 3/2004 | Tanaka et al. | 725/132 |
| 6,744,450 B1 | * | 6/2004 | Zimniewicz et al. | 715/841 |
| 6,807,558 B1 | * | 10/2004 | Hassett et al. | 709/203 |
| 6,832,373 B2 | * | 12/2004 | O'Neill | 717/171 |
| 6,910,208 B1 | * | 6/2005 | Zimniewicz | 717/174 |
| 6,918,113 B2 | * | 7/2005 | Patel et al. | 717/178 |
| 6,968,550 B2 | * | 11/2005 | Branson et al. | 717/168 |

(Continued)

OTHER PUBLICATIONS

"Web Management with Microsoft Visual SourceSafe 5.0", Que, Steven Banick et al, 1997, Whole book.*

*Primary Examiner*—Todd Ingberg
(74) *Attorney, Agent, or Firm*—Workman Nydegger

(57) ABSTRACT

A system and method for improved software servicing by installation of an updated version is provided. Using branch versioning techniques that support multi-branch development and release versioning techniques that support multi-version development, an update package may include updated files for each branch or release version. The least possible version from the update package may be installed to minimize the risk for potential software bugs introduced by the high frequency of changes made to a higher version. Additionally, any fix installed on a target machine running a particular version may be migrated when updating the target machine to a new version without losing the fix and regressing the change. Such an update may be uninstalled by reverse migration of any fixes before uninstalling files from the version update.

23 Claims, 11 Drawing Sheets

U.S. PATENT DOCUMENTS

| | | | |
|---|---|---|---|
| 6,990,660 B2 * | 1/2006 | Moshir et al. | 717/171 |
| 7,024,581 B1 * | 4/2006 | Wang et al. | 714/2 |
| 7,073,172 B2 * | 7/2006 | Chamberlain | 717/169 |
| 7,117,495 B2 * | 10/2006 | Blaser et al. | 717/174 |
| 7,181,738 B2 * | 2/2007 | Chan | 717/175 |

* cited by examiner

METHOD AND SYSTEM FOR SERVICING SOFTWARE

FIELD OF THE INVENTION

The invention relates generally to computer systems, and more particularly to an improved method and system for servicing software by installation of an updated version.

BACKGROUND OF THE INVENTION

Once software has been released for general availability, software bugs are often discovered which were not detected during prior testing. New or updated files that contain fixes to the software bugs, also known as hotfixes, may later be made available to replace some existing files containing the software bugs. Additionally, an existing software feature may be modified subsequent to release, or a new feature may be made available for release. Again, new or updated files that contain the modifications or the new feature may be made available to replace some existing files. These updates to software have traditionally been made by packaging a single copy of each file that needs to be updated on a system. This approach to updating software assumes customary linear file versioning for a single source code base into which file changes are made incrementally.

However, updating software using the approach for customary linear file versioning may fail for a software code base that is subsequently developed in parallel on two or more source code branches. A problem may arise whenever a file that needs to be updated has changed in a way that is incompatible with prior versions due to an intermediate change of that file taken from another source branch. For example, a file named foo.dll may be changed in a service pack that adds a new feature to the software. A new file named bar.dll that is dependent on foo.dll may also be included in the service pack for providing the new feature. This service pack may be applied to update the software on a target machine by replacing foo.dll and adding bar.dll on the target machine with the respective files provided from the source code branch for the service pack. The file foo.dll may also be changed in another source code branch for a hotfix package that corrects a software bug. The hotfix package may then be subsequently applied to update the software on the target machine by replacing foo.dll on the target machine with the file provided from the other source code branch. This may render foo.dll, upon which bar.dll depends, incompatible with the service pack software version. Updating such a file requires a change that is compatible with the prior service pack version and the newer hotfix package version of the file.

Another problem may arise whenever all the files on the system are updated at the same time such as during the intermediate change discussed above. In this case, any previously applied update may be lost. Returning to the example above, the file foo.dll that is replaced by the service pack update may have contained an earlier hotfix for a software bug that was made on yet another source code branch and loaded on the same target machine prior to loading the service pack. The changes that are compatible with the earlier version of the file need to be reapplied to the target machine.

A third problem may arise if the intermediate change is to be completely removed from the target machine. Typically, an uninstall program is used to remove any service pack or hotfix package. In the case of the example discussed above, the intermediate change may not be removed completely if the changes compatible with the earlier version of the file are reapplied to the target machine because the uninstall program will usually remove a file only if it is the version of the file that it installed. The changes compatible with the earlier version of the file, if reapplied, will therefore not be removed, and the file will be incompatible with files on the system after un-installation.

What is needed is a way for updating either selected files or all files of a target machine for updates made in a software code base developed in parallel on one or more branches. Additionally, such a system should allow previously loaded changes to be reapplied to the target machine and subsequent changes to be uninstalled so that the files are compatible after un-installation.

SUMMARY OF THE INVENTION

Briefly, the present invention provides an improved method and system for servicing software using branch versioning techniques that support multi-branch development. Any number of branch versions of updated binary files may be included in an update package installable by the present invention, including only a single branch version. Advantageously, a multi-branch update package may include a directory of binary files for each branch version and a set of installation files usable for installation of any branch version. Any fix installed on a target machine running a particular branch version may be migrated when updating the target machine to a new branch version without losing the fix and regressing the change.

The present invention also allows an update package and any migrated fixes to be uninstalled. To do so, the present invention may reverse migrate any migrated fixes before uninstalling the update package. Once any migrated fixes to the update package are uninstalled, the update package may then be uninstalled on the target machine.

The present invention additionally provides a system of components including an Extractor, Installer, Migrator, and Uninstaller. In general, the Installer may install the least possible version of appropriate files on the target system once the files have been extracted from the update package by the Extractor. To aid the Installer in determining which files from the update package to put on the target machine, the present invention provides a branch attribute tree that may generally be used to establish whether a binary file in an update package was built from a branch version that is a superset or subset of another binary file's branch version. By installing the least possible version, the present invention may help minimize the risk for potential software bugs that may be introduced by the high frequency of changes made to a higher branch version. But whenever there is any target file with a lesser release version and greater branch version than the source file being installed, the Installer may step up to install updated files from a higher branch version.

The present invention may also support multi-version software development using release versioning to provide updates. This may be accomplished with simplified installer analysis. Moreover, like the multi-branch versioning technique, a fix installed on a target machine running a particular release version may be migrated when updating the target machine to a new release version. Each multi-version update package may include a directory of binary files for each release version and a set of common files usable by each release version. Thus, the update package from the multi-version development environment may advantageously include a fix made from an earlier release version and also made to a later release version. Similar to the multi-branch technique, the fix for the later release version may be saved on the target machine in a known location for future installation if the target machine upgrades to the later release version. The present invention also provides for uninstallation of such an upgrade. If there are any such fixes migrated after an installation, the Uninstaller for the multi-version embodiment may reverse migrate the fix before uninstalling files from the release version update.

Other advantages will become apparent from the following detailed description when taken in conjunction with the drawings, in which:

DETAILED DESCRIPTION

Exemplary Operating Environment

Figure 1:
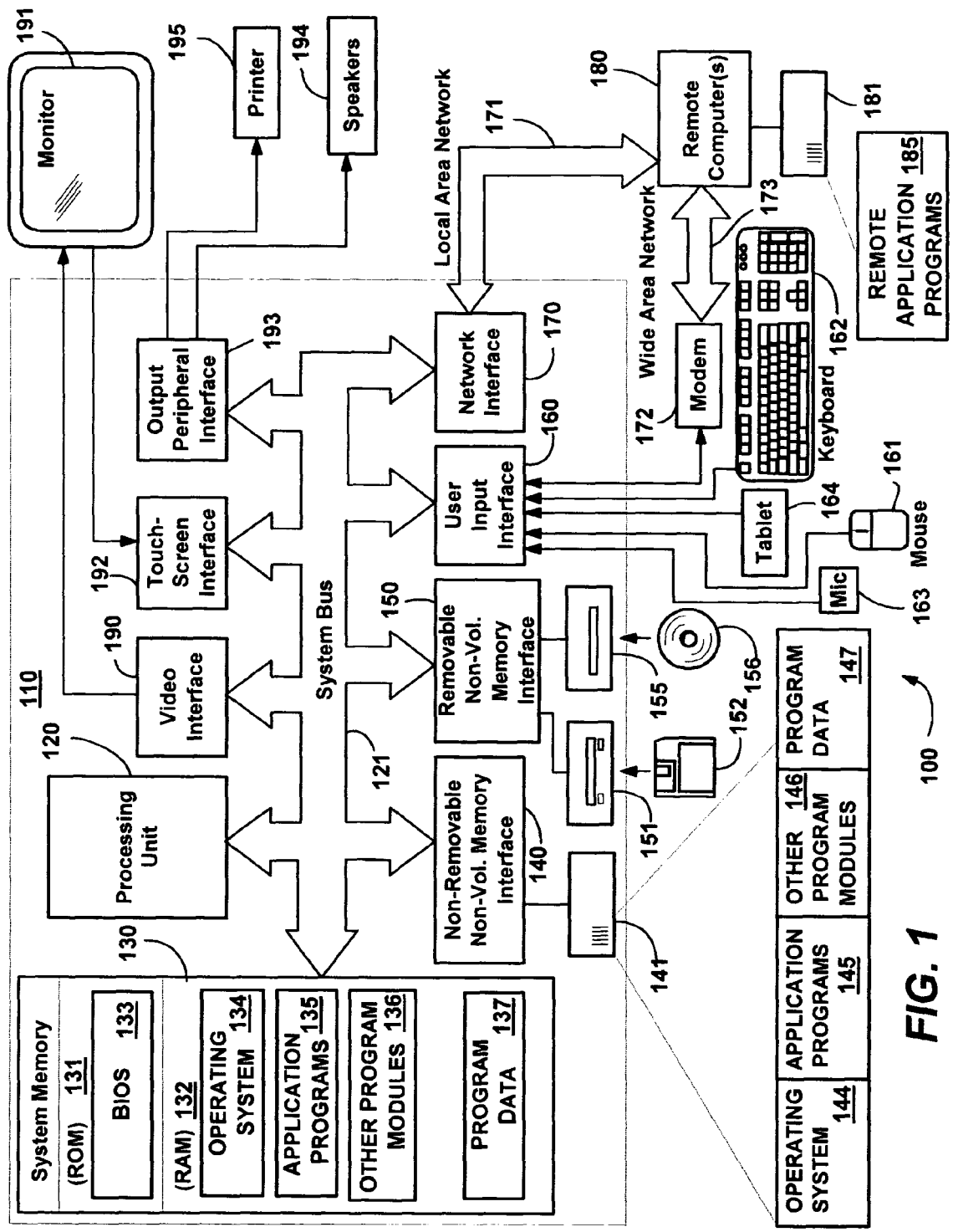
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 194, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Servicing Software for Multi-Branch Software Development

The present invention is generally directed towards an improved method and system for servicing software by installation of an updated version. As will be seen, the present invention provides branch versioning techniques that support multi-branch development and further provides release versioning techniques that support multi-version development. As used herein, a branch means one or more successively numbered updated versions of software source code from a software code base. An updated version means a version with at least one file that has been changed, added, or deleted from the preceding version. Any number of branch versions of updated binary files may be included in an update package installable by the present invention, including only a single branch version. An update package may carry any number of branch versions of updated binary files that include a fix so that the update package may have whatever branch version is needed for the particular version running on the target machine. Advantageously, any higher branch version of the fix applied may be stored on the target machine so that it is available for migration if the target later upgrades its version. Thus, any fix installed on a target machine running a particular branch version may be migrated when updating the target machine to a new branch version without losing the fix and regressing the change. In accordance with the invention, the least possible version from the update package may be installed to help users minimize their risk for potential software bugs introduced by the high frequency of changes made to a higher branch version. As will be understood, the various block diagrams, flow charts and scenarios described herein are only examples, and there are many other scenarios to which the present invention will apply.

Figure 2:
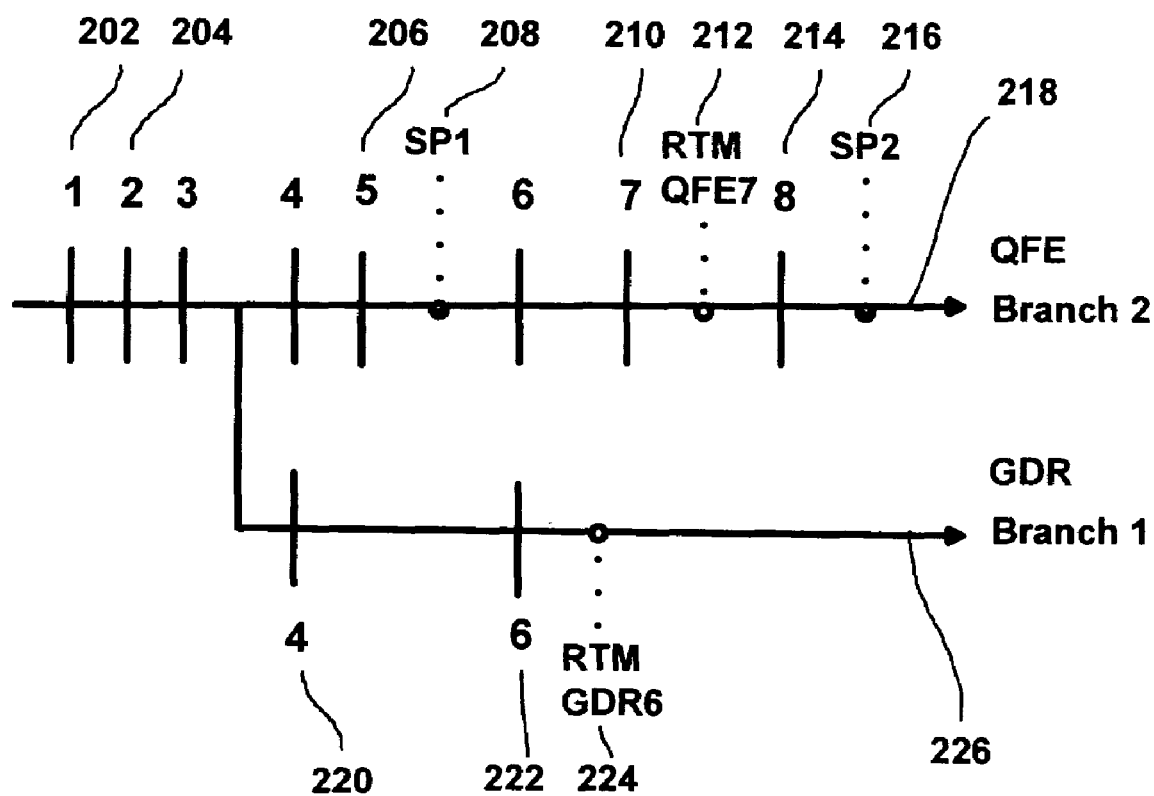
FIG. 2 is a general illustration of a multi-branch software code base, in accordance with an aspect of the present invention.

Turning to FIG. 2 of the drawings, there is shown a general illustration of a multi-branch software code base. Immediately prior to the release of a software product, software development may proceed in parallel on two or more source code branches. When this occurs, a copy of the source code base, defined herein as the "release branch", may be made from the original source code based, defined herein as the "development branch". The current software product may continue to stabilize on the release branch while development of the next product continues uninterrupted on the development branch. Each of the branches of a parallel code base, such as GDR Branch 1 226 and QFE Branch 2 218, may include successively numbered branch versions as shown in FIG. 2 on each branch. As used herein, a branch version means one of the successively numbered versions of a branch of a software code base. Each numbered branch version, such as version 2 204, has one or more files changed, and/or one or more additional files, and/or one or more files deleted from the preceding branch version, such as branch version 1 202. The first branch 226 is a release branch labeled GDR and is known as the General Distribution Release (GDR) branch. The GDR branch is a source code branch where critical hotfixes may be made available for general distribution. Each GDR version may be released separately, such as GDR version 6 222 shown released as release version RTMGDR6 224. The second branch 218 is a development branch labeled QFE and is known as the Quick Fix Engineering (QFE) branch. The QFE branch is a source code branch where all hotfixes may be made. Every change made to a release branch such as the GDR 226 is also made to a development branch such as the QFE 218, but not every change to a development branch is usually made to a release branch. Having multiple branches for hotfixes may enable users to obtain hotfix packages that only contain the critical fixes from the GDR branch and may thereby help users minimize their risk for potential software bugs introduced by the high frequency of changes made to the QFE branch. Each QFE branch version may be released as a separate update release package, such as QFE branch version 7 210 shown released as release version RTMQFE7 212, or each QFE branch version may be part of an update release package such as a Service Pack (SP) release. As used herein, a release version means a numbered version of a release update package such as SP1 208 or SP2 216. Alternatively, all or some hotfixes from a QFE branch version may be included as part of a SP release. A SP release may contain all or some hotfixes, and/or minor fixes, and/or additional new features. The QFE branch 218 shows two Service Package (SP) release versions made available for release during development of the source code. The SP1 release version 208 shown in FIG. 2 includes all source code changes of QFE branch version 5 206. And the SP2 release version 216 includes all source code changes of QFE branch version 8 214. Just as there may be several release versions available from a given branch, there may also be several branch versions available for a given release version of an update package. For example, GDR branch version 4 220 may be available as a separate SP1 release in addition to SP1 release version 208 with QFE branch version 5 206.

It will be appreciate by those skilled in the art that the multi-branch software code base illustrated in FIG. 2 is an examplary illustration and that the present invention may be practiced using other multi-branch source code development environments. For example, the present invention supports any number of branches in a multi-branch source code development environment.

Figure 3:
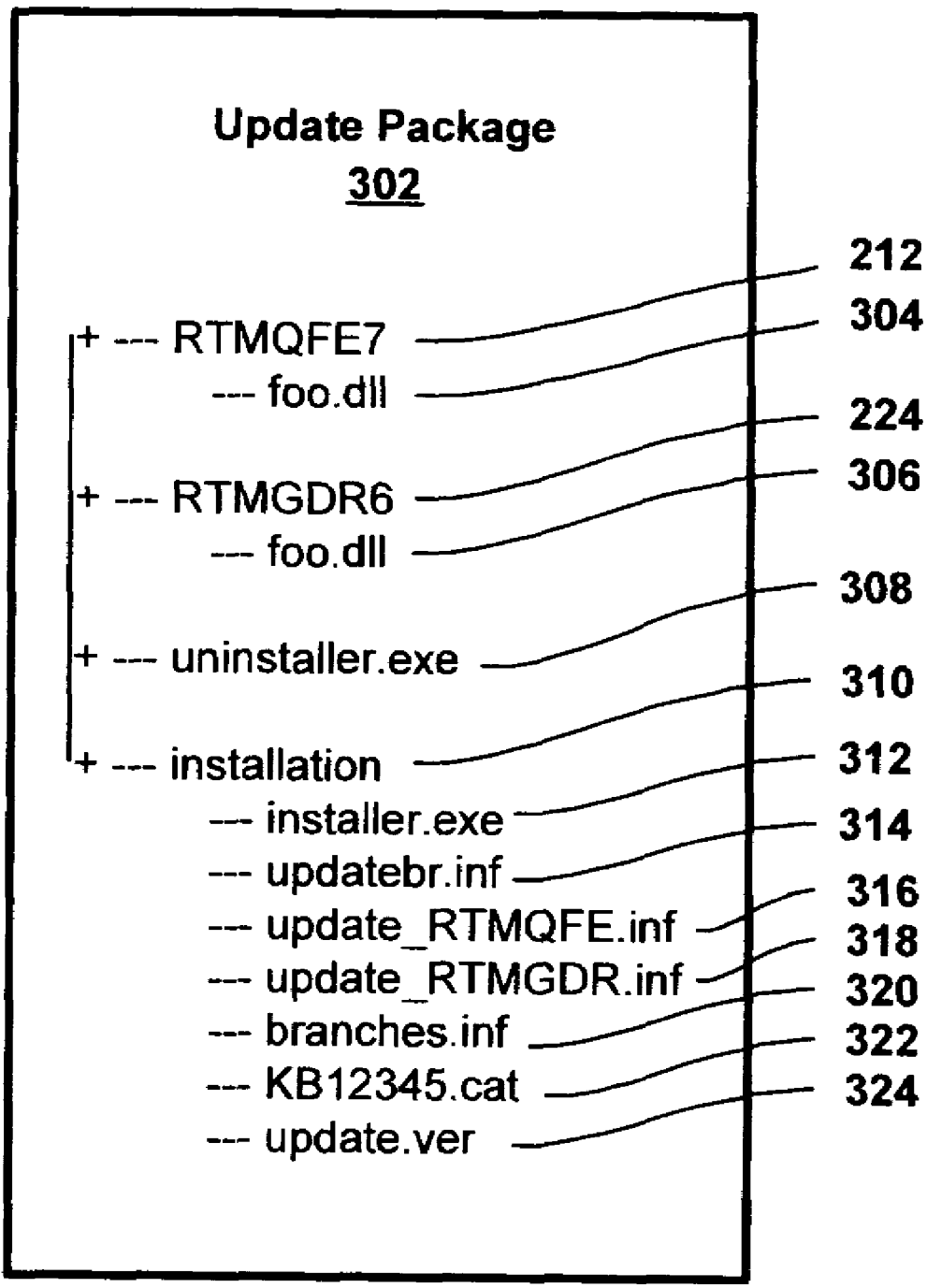
FIG. 3 is a general representation of files in an update package from a multi-branch software code base, in accordance with an aspect of the present invention.

FIG. 3 presents a general representation of binary files in an update package from a multi-branch software code base. In general, an update package means a set of data including an updated version of binary files built from a source code base. A release means a set of updated files from a given branch. A service pack is an update package made as a release. An update package 302 may include a directory of binary files for each branch version, such as RTMQFE7 212 and RTMGDR6 224, an Uninstaller executable 308, and a set of installation files 310 usable for installation of any branch version. The directory of binary files for each branch version may include one or more files that have been changed, and/or added, and/or deleted from the previous branch version. For example, the directory RTMQFE7 212 includes the file foo.dll 304 which may have been changed from the previous branch version of the foo.dll file in QFE branch version 6. The directory RTMGDR6 224 includes the file foo.dll 306 which may have been changed from a previous version of the foo.dll file in the GDR branch version 4 220 of the product. The set of installation files 310 may include an Installer executable 312 and binary files supporting the Installer. The binary files supporting the installer may include an updatebr.inf 314 file, an update.inf file such as update_RTMQFE.inf 316 or update_RTMGDR.inf 318, a branches.inf 320 file, a catalog file such as KB12345.cat 322, and an update.ver 324 file. The updatebr.inf 314 file may include a list of installation information files (update.inf) for each branch version number on the target machine. The update.inf file may have information for installation of a branch version such as a version section for ensuring that the particular branch version may only be installed on a specific platform. The branches.inf 320 file may include file version information and branch attribute information. The catalog file may be a hash file that provides authenication of the binary files included in the update package and may also contain the branch information of each file. The update.ver file may be a manifest that provides a list of files included in the update package.

Those skilled in the art will appreciate that the update package represented in FIG. 3 is an exemplary representation and that the present invention may be practiced by packaging the updated files in other ways, such as the binary files supporting the Installer could be merged into a monolithic file, updated files could be included within each set of branch version files, and so forth.

Figure 4:
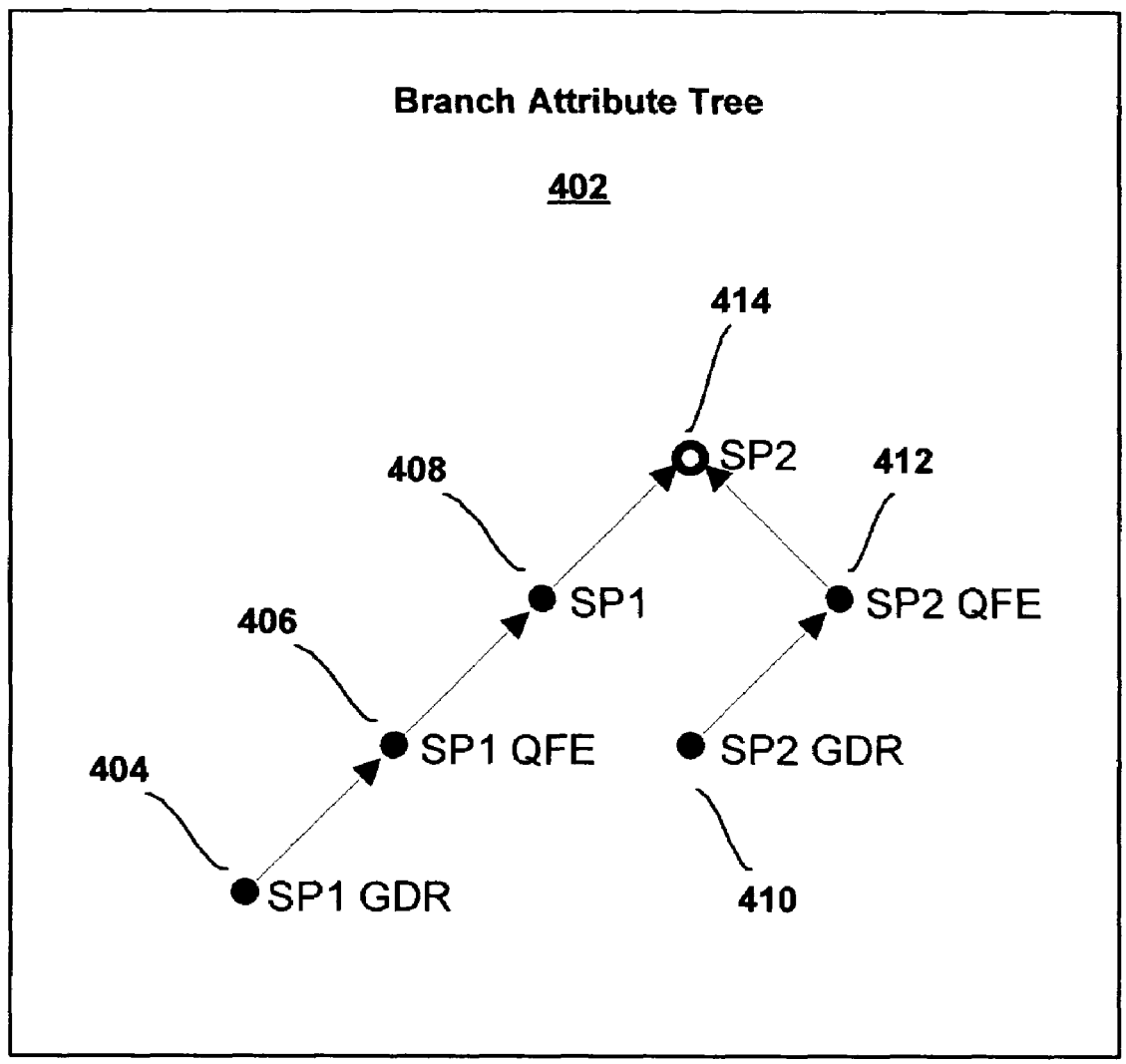
FIG. 4 is an exemplary illustration generally representing a data structure for storing relationship information about release versions and branch versions of the software code base, in accordance with an aspect of the present invention.

FIG. 4 is an exemplary illustration generally representing a data structure for storing relationship information about release versions and branch versions of a multi-branch software code base. An n-tree may be used to represent the n-branches of a software code base. Each node is a superset of the attributes of its decendant nodes and each node is a subset of the attributes of its ancestor nodes. Each node of the n-tree may include information about branches of the software code base, such as a branch attribute, and/or each node may include information about an update package from the software code base, such as a release attribute. A branch attribute may indicate the branch version of the source code from which a binary file in the update package was built. And a release attribute may indicate the release version of the binary files in the update package. As used herein, a branch attribute tree means the tree described above. Generally, the branch attribute tree 402 in FIG. 4 illustrates the relationship of six branches, SP1 GDR 404, SP1 QFE 406, SP1 408, SP2 GDR 410, SP2 QFE 412 and SP2 414. For example, node 404 includes a branch attribute and indicates that branch version SP1 GDR is a subset of its parent node 406, branch version SP1 QFE. Likewise node 408 includes a release attribute and indicates that release version SP1 is a superset of its child node 406. The branch attribute tree may generally be used to establish whether a binary file in an update package was built from a branch version that is a superset or subset of another binary file's branch version, or whether the two files are incomparable. Two files are comparable if one file is the ancestor of the other. Otherwise, they are incomparable. For example, binary files from branch version SP2 QFE 412 may not be compared to binary files from branch versions SP1 408, SP1 QFE 406 or SP1 GDR 404. Similarly, binary files from branch version SP1 GDR 404 may not be compared to binary files from branch versions SP2 GDR 410 or SP2 QFE 412. As will be seen, the installer may use the branch attribute tree to choose the binary files from a branch version in a multi-branch update package during installation.

A branch attribute tree may be stored in a file named branches.inf that includes file version information and branch attribute information. The file version information may have a file version key that may be used to compare the branches.inf file on the target system to the one in a particular update package. The installer in the update package may choose to use the branches.inf file that is the most recent version. The branch attribute information in the branches.inf file may have an entry for each branch version in the update package that lists the branch name, its parent branch name, and a display name or description of the branch version. If the update package has a newer version of the branch information file, it will be installed on the target machine.

Those skilled in the art will appreciate that the branch attribute tree illustrated in FIG. 4 is an exemplary data structure and that the present invention may be practiced by storing relationship information about release versions and branch versions of a software code base in other ways, such as a table indexed by branch/release version with each entry including a linked lists of branch/release version subsets and a linked list of branch/release version supersets and a linked list of incomparable branch/release versions.

Figure 5:
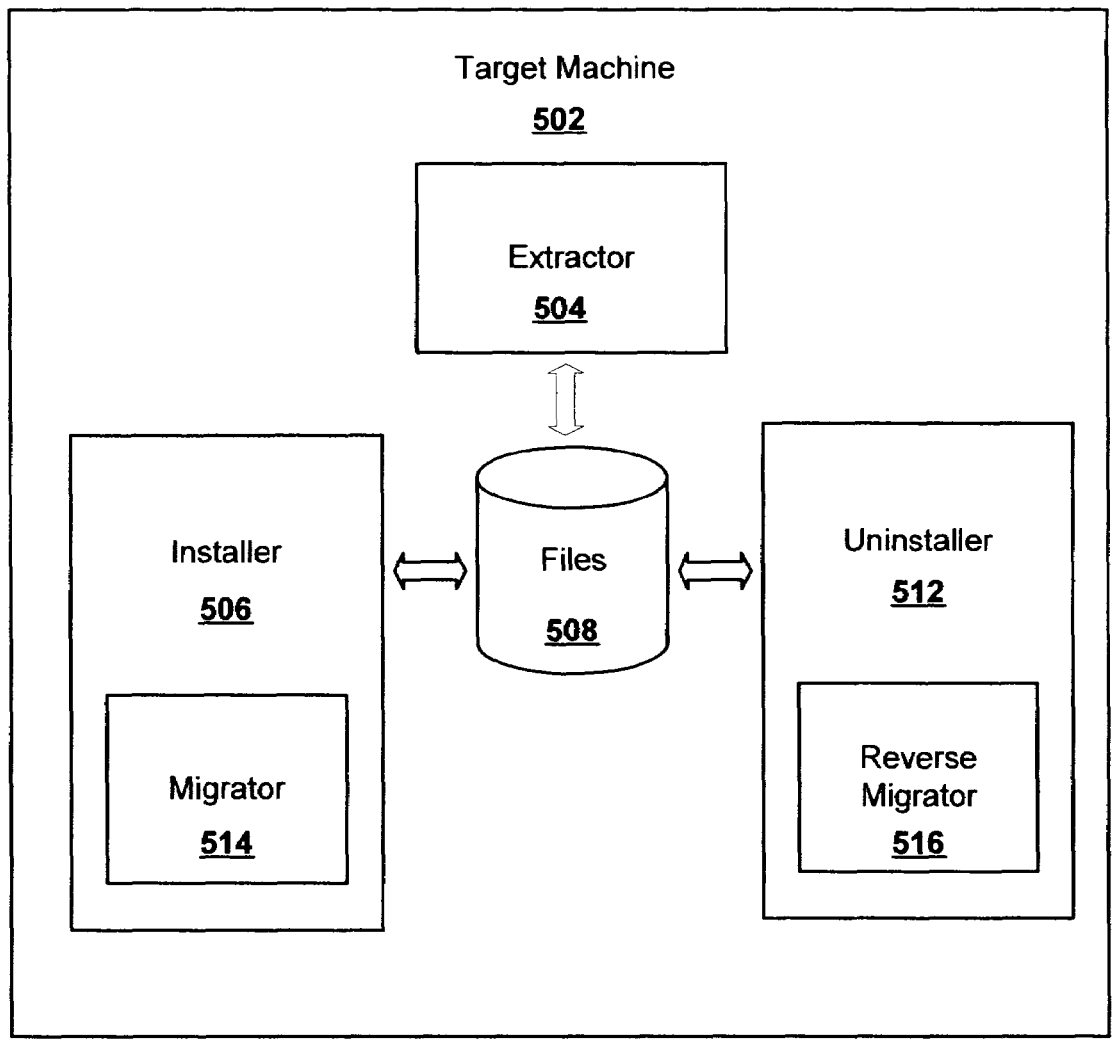
FIG. 5 is a block diagram generally representing the components in an exemplary embodiment of the system for servicing software, in accordance with an aspect of the present invention.

FIG. 5 is a block diagram generally representing the components in an exemplary embodiment of the system for servicing software. Those skilled in the art will appreciate that the functionality implemented within the blocks illustrated in the diagram may be implemented as separate components or the functionality of several or all of the blocks may be implemented within a single component. For example, the functionality of the Extractor 504 may be included in the Installer 506. Or the functionality for migrating extracted files in the Installer 506 may be implemented in a separate component.

The Extractor 504 generally expands the contents of an update package, arranges them in a temporary directory on the target system, and launches the Installer 506 to install the appropriate files extracted from the update package on the target system. The files selected for an update package may be previously compressed into a cabinet file (CAB) to make the update package. The cabinet (or CAB) format is a file format in which files are essentially appended to one another (concatenated) prior to compression to improve encoding efficiency. The Extractor uncompresses the files from a cabinet format during extraction, so that the files may be in their original form before the Installer begins installation.

The Extractor 504 may be a self-executable part of a cabinet package or may be a separate component already residing on the target machine. Those skilled in the art will appreciate that other file organizations or compression techniques may be used. Moreover, the present invention may be used without an Extractor but instead have the update package in its uncompressed form copied to a directory on the target machine for installation.

The Installer 504 generally verifies that the software version running on the target machine is intended for the files from the update package, determines which files from the update package to put on the target machine, determines where to put those files on the target machine, and copies those files to their appropriate locations. The Installer 504 also may generally verify that there is sufficient disk space for the installation procedure, copy replaced files along with an uninstall executable in an uninstall directory, and inform a user of its activities through a user interface. The Installer 506 may also include a Migrator 514 for automatically reinstalling a fix after installation of the files from an update package.

The Installer 506 may select the least possible version from the update package that it can safely install so that the target machine may receive the fewest fixes to reduce the risk of introducing new software bugs that may exist from the fixes. In copying binary files from the update package to the target directories, the installer overwrites the target file with the updated file whenever the file already exists in the target directory. If the file is new to the target directory, the installer adds the file to the target directory. If a file is to be removed from the target directory, the installer deletes it.

The files 508 include the binary files of the software version running on the target machine and stored on hard disk. In addition, the files 508 may include the files from the update package for installation and any files stored for uninstallation in an uninstall directory.

The Uninstaller 512 may generally determine which files from the uninstall directory to restore back on the target machine, determine where to put those files on the target machine, and copy those files from the uninstall directory back to their former locations from which they were copied to the uninstall directory during installation of the update package. The Uninstaller 512 may also generally verify that there is sufficient disk space for the uninstall procedure, clean up the copy of files from the uninstall directory after they have been restored, and inform a user of its activities through a user interface. The Uninstaller 512 may also include a Reverse Migrator 516 for uninstalling a migrated fix prior to uninstallation of the files from an update package.

A user may initiate an uninstall procedure through a user interface by selecting a remove command made available for uninstalling an update package. When the remove command is selected for uninstalling an update package, the Uninstaller is launched from the uninstall directory to re-install the binary files in that directory back into the appropriate locations on the target machine.

Figure 6:
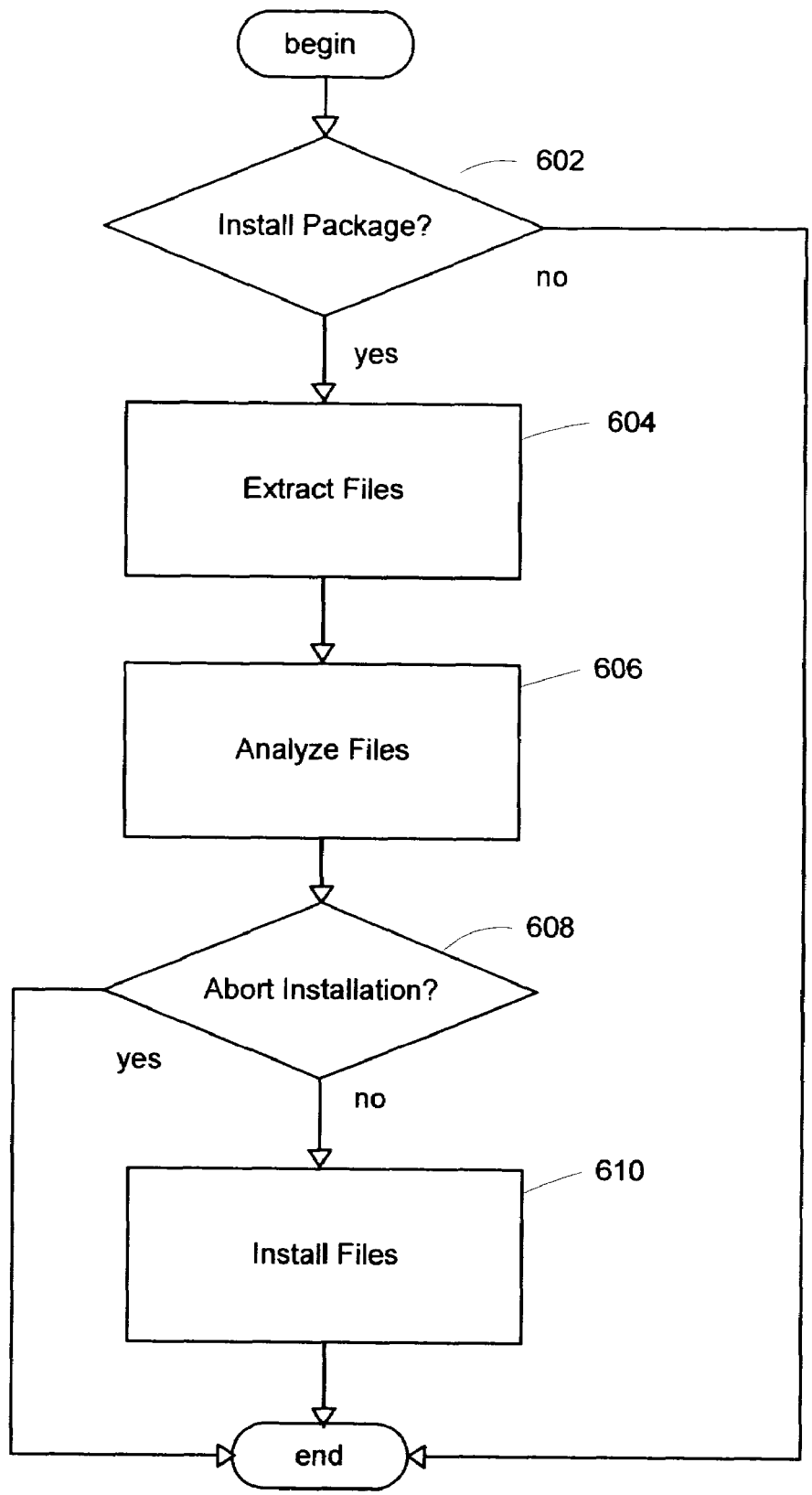
FIG. 6 is a flowchart generally representing the steps undertaken by the system for servicing software to install an update package, in accordance with an aspect of the present invention.

FIG. 6 is a flowchart generally representing the steps undertaken by the system for servicing software to install an update package. First the target system checks if an update package is to be installed at step 602. If there is not, then system is finished processing. However, if there is an update package to be installed, then the target system extracts files from the update package at step 604. Once the files have been extracted from the update package, the target system analyzes the files from the update package and the version of the software running on the target at step 606 to determine which files from the update package to install on the target machine. During analysis, the Installer may decide to abort installation at step 608 if a file from the update package cannot be compared to a file from the target machine. After determining which files to install, the system installs those files from the update package on the target machine at step 610. The system is finished processing after installing the files from the update package.

Figure 7:
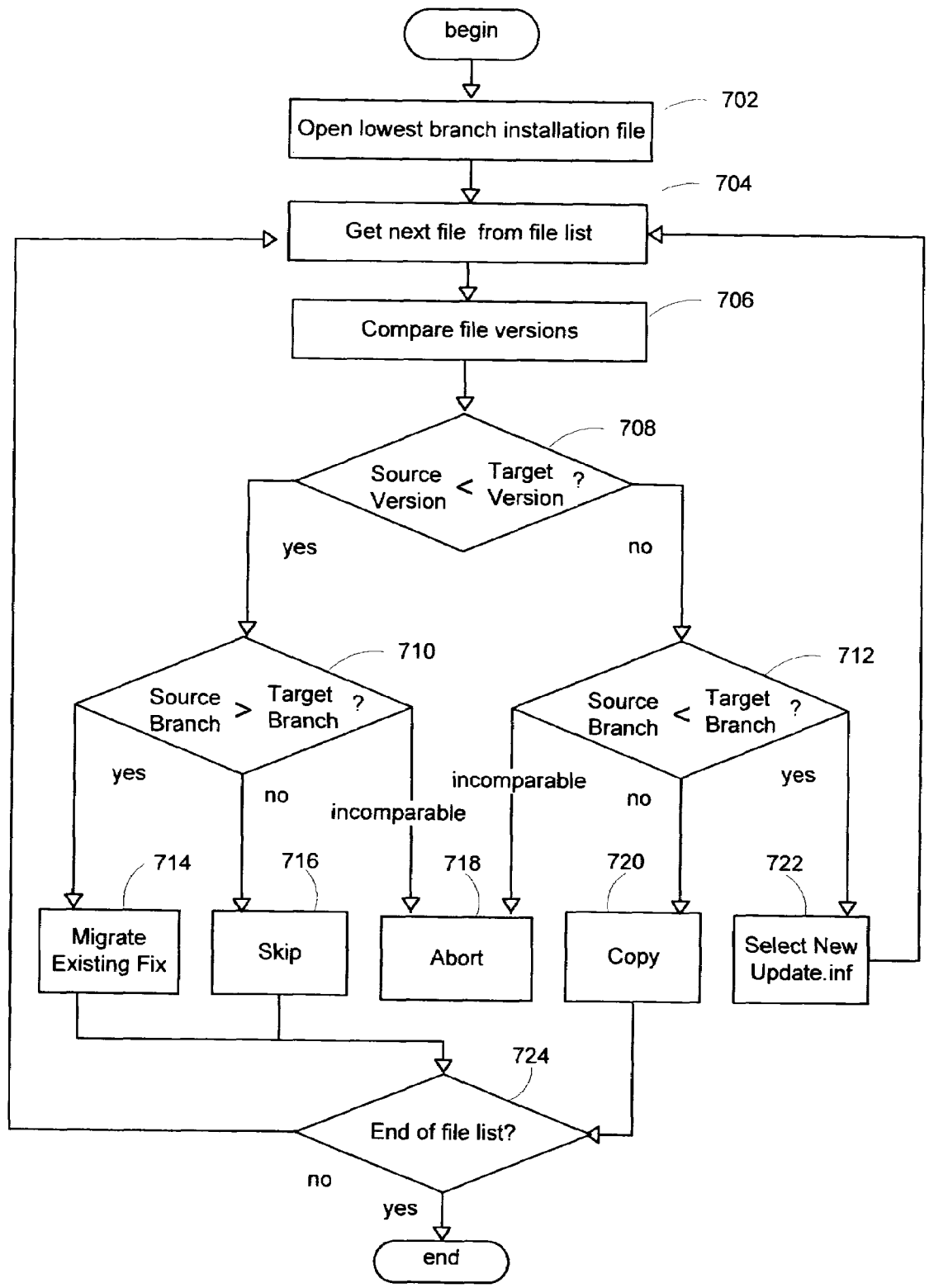
FIG. 7 is a flowchart generally representing the steps undertaken by the system for servicing software to analyze the files from an update package for installation on a target machine, in accordance with an aspect of the present invention.

FIG. 7 is a flowchart generally representing the steps undertaken by the system for servicing software to analyze the files from an update package for installation on a target machine. The Installer 506 selects the lowest branch installation information file by consulting updatebr.inf which lists which installation information file (update.inf) to start with for each release version number on the target machine. For a single branch version update package, there may be only one information file listed in the package. The Installer 506 may then open the lowest branch installation information file, update.inf, at step 702. Installing the least possible version may help users minimize their risk for potential software bugs introduced by the high frequency of changes made to a higher branch version such as a QFE branch. As used herein, the term "source" means that the file is from an update package and the term "target" means the file is from the target machine.

The Installer 506 then gets the first file from the file list of installable files for that branch version at step 704. It next compares the source release version number of that file to the target release version number of that file at step 706. Upon determining at step 708 that the source release version number is less than that target release version number, the Installer proceeds at step 710 to determine whether the source branch version number is greater than the target branch version number. If the source branch version number is greater than the target branch version number, then the target file may have been previously installed by a fix and the Installer proceeds to identify the fix for migration on the target machine at step 714. Otherwise, the Installer determines that the source branch version number is equal or less than the target branch version number and proceeds to record at step 716 to skip installing that source file on the target machine, or the Installer is unable to make a determination at step 710 because the files cannot be compared. In this case where the files are incomparable, the Installer aborts the installation of the upgrade package at step 718.

Whenever there is any target file with a greater release version and lesser branch version than the source file being installed, there may have been a fix that was installed on the target machine. Any update packages with fixes that have been installed to the machine may be persistently stored in a migration directory. Each update package stored in the migration directory may have an update.ver file which may have a list of all the package contents along with hashes that uniquely identify each file. The installer may search the hashes in all of the update.ver files persisted in the migration directory to find the file and identify what fix (update package) is responsible for putting that file on the target system. If the fix is in the migration directory and has a branch version equal to (or greater than) the source branch, it may be installed after all other sources have been installed. Installing such a fix is herein referred to as a migration. Any package in the migration directory identified for migration during analysis may be installed after the installer has copied all source files that it can immediately install to the target machine. If a fix cannot be migrated, the Installer will roll back all fixes. After each update package is migrated, the new name of the old uninstall directory and the name of the newly created uninstall directory may be added to a ReverseMigrate section of an uninstall information file used for reverse migration at uninstall time. For example, an entry that contains the uninstall path and the old uninstall path may be made in the uninstall information file. These entries may appear in the reverse order in which the fixes were migrated. Once migration is complete, the system may verify that any migrated target files are of the appropriate version and branch.

Turning again to step 708, if the Installer determined at step 708 that the source release version number is not less than that target release version number, the Installer proceeds at step 712 to determine whether the source branch version number is less than the target branch version number. If the source branch version number is less than the target branch version number, the Installer proceeds to select a new branch installation information file, update.inf, from the next lowest branch version of the update package at step 722. Otherwise, the Installer determines that the source branch version number is equal or greater than the target branch version number and proceeds to record at step 720 to install that source file by copying it on the target machine, or the Installer is unable to make a determination at step 712 because the files cannot be compared. In this case where the files are incomparable, the Installer aborts the installation of the upgrade package at step 718.

Whenever there is any target file with a lesser release version and greater branch version than the source file being installed as indicated at step 722, then the Installer will need to step up to a higher branch version and start analysis over again by comparing files to determine which files need to be copied during installation of the package. To do so, the Installer may identify the branch version number for the target files in order to select appropriate source branch version. To determine what the branch version number is for files on the target system, the Installer may first check the version information of the file to see if it contains an embedded branch version information string such as "filebranch=RTMGDR". If not, then the Installer can determine the branch version number using a catalog that is part of the package. Each catalog that is installed as part of the package contains a lookup table that has hashes or files' signatures for verification of file identity and also additional information including the branch version information that allows associating an authentication hash with a branch attribute.

Turning again to FIG. 7 at step 724, after deciding to migrate the existing fix at step 714 or recording to skip installation of that source file at step 716 or recording to copy that source file at step 722, the Installer checks at step 724 if this was the last file in the file list of installable files for that branch version. If this is the last file, then analysis is finished. If this is not the last file, the Installer gets the next file in the file list of installable files for that branch version at step 706, and analysis continues in this fashion until the list of installable files for that branch version have been recorded for installation from the upgrade package or installation is aborted.

Figure 8:
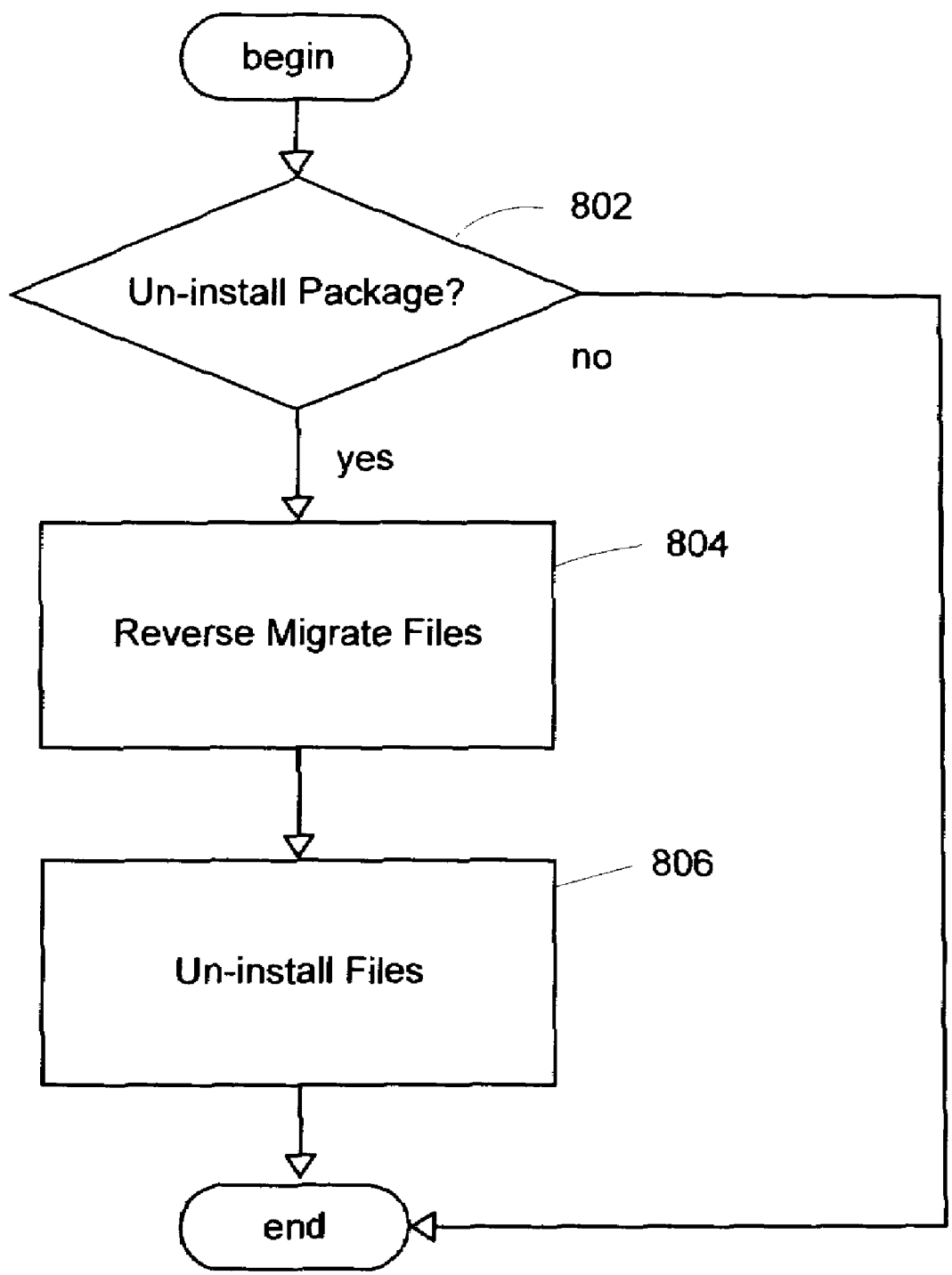
FIG. 8 is a flowchart generally representing the steps undertaken by the system for servicing software to uninstall an update package, in accordance with an aspect of the present invention.

FIG. 8 is a flowchart generally representing the steps undertaken by the system for servicing software to uninstall an update package. First the target system may check if an update package is to be uninstalled at step 802. If there is not, then system is finished processing. However, if there is an update package to be uninstalled, then at step 804 the system may first reverse migrate any fixes that were migrated during installation of the update package now being uninstalled. During reverse migration, the uninstaller may remove any files installed for a migrated fix and restores the previous path of the uninstall directory as it existed before that fix was migrated. Once any migrated fixes to the update package are uninstalled, the update package may then be uninstalled on the target machine at step 806. The system is finished processing after uninstalling the files from the update package.

As can be seen, the present invention provides an improved method and system for servicing software using branch versioning techniques that support multi-branch development. Any number of branch versions of updated binary files may be included in an update package installable by the present invention, including only a single branch version. In an alternate embodiment, the present invention may also be advantageously used to update a target system with a release version such as SP1 208 or SP2 216. In this alternate embodiment, the present invention may have a different update package for release versions and simplified installer analysis.

Servicing Software for Multi-Version Software Development

As will further be understood, the present invention may also support multi-version software development using release versioning to provide updates. This may be accomplished with simplified installer analysis. Unlike the analysis performed by the Installer 506 for an update package from a multi-branch software code base, there is no need for comparing branch versions of files nor stepping up to higher branch versions during installation because an update package from a multi-version software code base may contain release versions rather than branch versions. A fix for a given release version may be applied to a target machine running that release version. Moreover, like the multi-branch versioning technique, the update package may carry any number of release versions of updated binary files that include a fix so that the update package may have whatever release version is needed for the particular version running on the target machine. Advantageously, any higher version of the fix applied may be stored on the target machine so that it is available for migration if the target later upgrades its release version. Thus a fix installed on a target machine running a particular release version may be migrated when updating the target machine to a new release version without losing the fix and regressing the change. For example, a fix for release version SP2 216 may be installable on a target machine running an RTM release version or an SP1 release version. If the fix is installed on a target machine running an RTM release version, the fix would regress when the target machine upgrades to the SP1 release version. The update package from the multi-version development environment may advantageously include the fix made from the RTM release version and the fix made from the SP1 release version. Similar to the multi-branch technique, the fix for the SP1 release version may be saved on the target machine in a known location for installation at the end of the SP1 upgrade in the multi-version embodiment. If the SP1 upgrade is later uninstalled, the Uninstaller for the multi-version embodiment may reverse migrate the fix for the SP1 release prior to uninstalling files from the SP1 upgrade.

Figure 9:
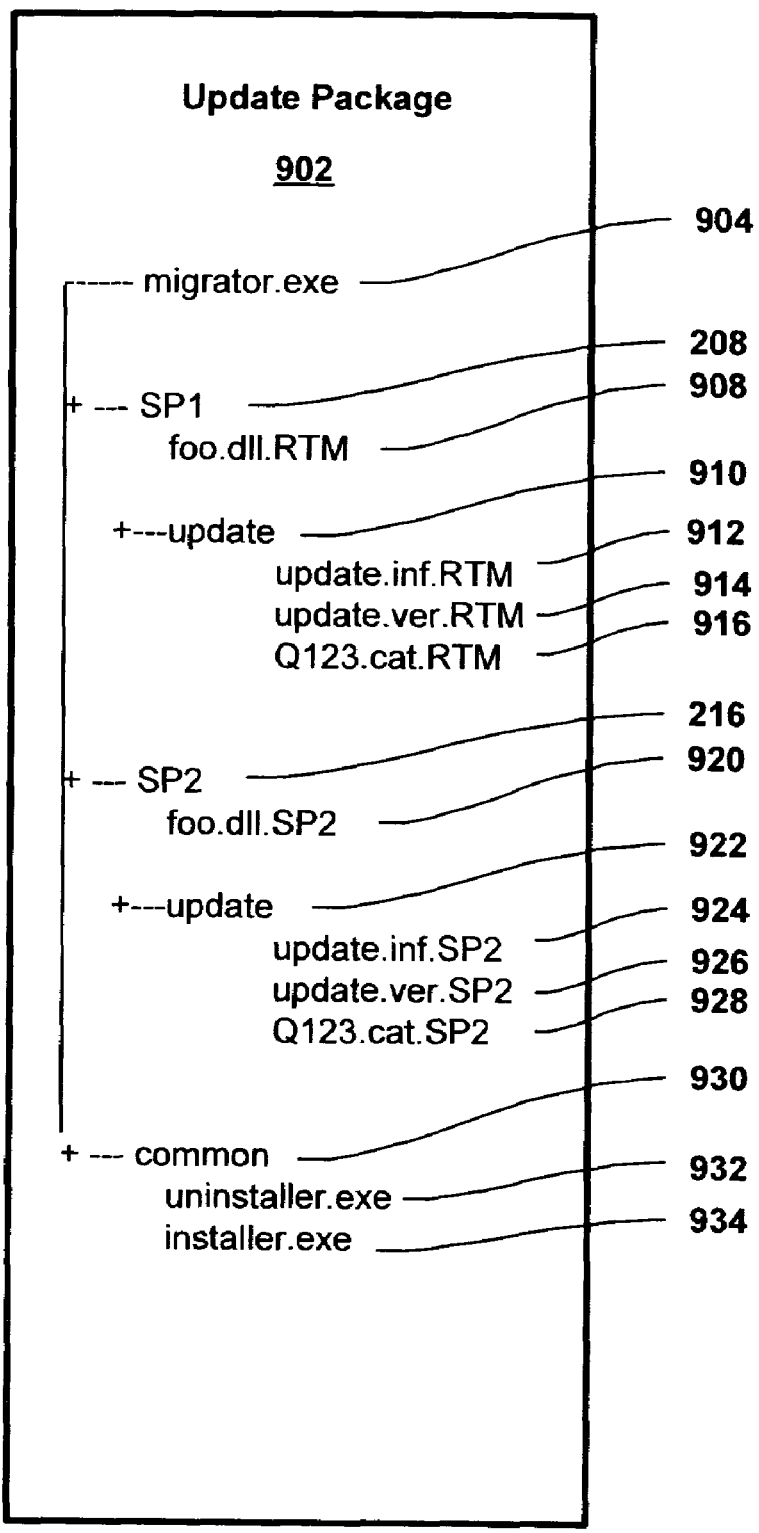
FIG. 9 is a general representation of files in an update package from a multi-version software code base, in accordance with an aspect of the present invention.

Turning to FIG. 9, a general representation of binary files in an update package from a multi-version software code base is presented. An update package 902 may include a Migrator 904 executable, a directory of binary files for each release version, such as SP1 208 and SP2 216, and a set of common files 930 usable by each release version, such as an Installer 934 executable or an Uninstaller 932 executable. The directory of binary files for each release version includes a set of binary files for the release version and binary files supporting the installer for installing the package. The set of binary files for the release version include one or more files that have been changed, and/or added, and/or deleted from the previous release version. For example, the directory SP1 208 includes the file foo.dll.RTM which has been changed from the previous version of the foo.dll file in the initial release, known as Release To Manufacture (RTM). The directory SP2 includes the file foo.dll.SP2 which has been changed from the previous version of the foo.dll file in the SP1 release of the product. The binary files supporting the installer may include an update.inf file such as update.inf.RTM 912 or update.inf.SP2 924, an update.ver file such as update.inf.RTM 914 or update.inf.SP2 926, and an catalog file such as Q123.cat.RTM 916 or Q123.cat.SP2 928. The update.inf file may have information for installation of a release version such as a version section for ensuring that the particular release version may only be installed on a specific platform. The update.inf file may also have information for running executables before installation, during installation, and/or after installation. These executables may be the Migrator 904 or the Installer 934. The update.ver file may be a manifest that provides a list of files included in the update package. The catalog file may be a hash file that provides authenication of the binary files included in the update package and may also contain the branch information of each file.

Those skilled in the art will appreciate that the update package represented in FIG. 9 is an exemplary representation and that the present invention may be practiced by packaging the updated files in other ways, such as the binary files supporting the installer could be merged into a monolithic file, common files could be included within each set of branch version files, and so forth.

Figure 10:
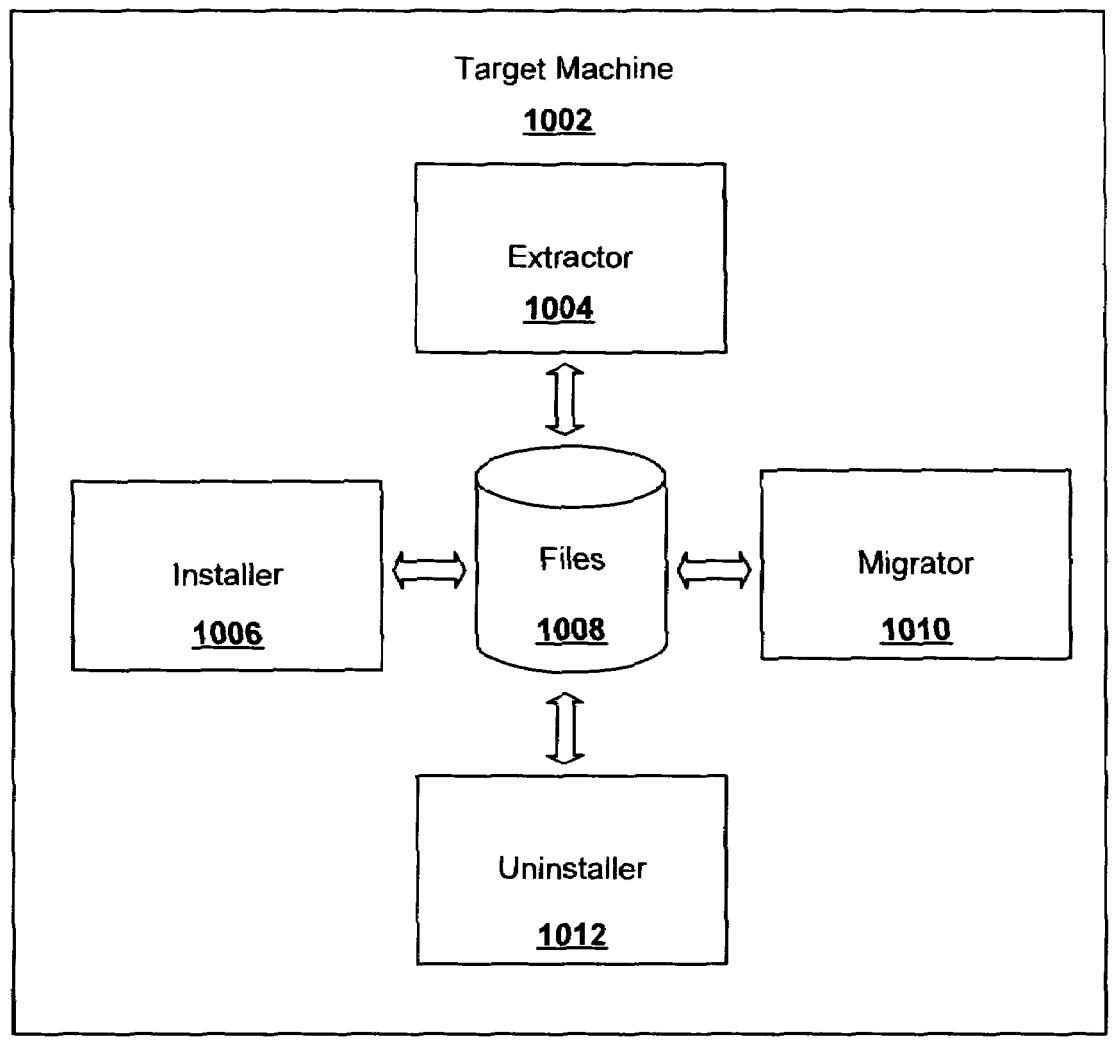
FIG. 10 is a block diagram generally representing the components in an exemplary embodiment of the system for servicing software from a multi-version software code base, in accordance with an aspect of the present invention.

FIG. 10 is a block diagram generally representing the components in an exemplary embodiment of the system for servicing software from a multi-version software code base. Those skilled in the art will appreciate that the functionality implemented within the blocks illustrated in the diagram may be implemented as separate components or the functionality of several or all of the blocks may be implemented within a single component. For example, the functionality of the Extractor 1004 may be included in the Installer 1006. Or the functionality for analyzing source files and target files in the Installer 1006 may be implemented in a separate component.

The Extractor 1006 is similar to the Extractor 504 previously described in FIG. 5. Generally, it expands the contents of an update package, arranges them in a temporary directory on the target system, launches the Migrator 1010 to re-arrange the extracted contents of an update package as necessary, and launches the Installer 1006 to install the appropriate files extracted from the update package on the target system.

As shown in FIG. 10, the Migrator 1010 may be a separate component in the multi-version embodiment of the present invention. The Migrator 1010 may include migration functionality of the Installer 506 previously described in FIG. 7 and may additionally include new or different functionality. For example, the Migrator may have functionality to determine which release version to install and then launch the Installer 1006 to perform the installation. Furthermore, if the Migrator determines that the Installer should install the lower release version in an update package such as SP1 208, then the Migrator may create a directory on the target system before installation of the lower version and store the higher version contained in the update package such as SP2 216 so that it may be available in the future for later installation. The Migrator 1010 may also include migration functionality of the Uninstaller 512 previously described in FIG. 8. For example, the Migrator may perform reverse migration during uninstallation.

The Installer 1006 generally verifies that the software version running on the target machine is intended for the files of the release version from the update package, determines which files of the release version from the update package to put on the target machine, determines where to put those files on the target machine, and copies those files to their appropriate locations. The Installer 1006 also may generally verify that there is sufficient disk space for the installation procedure, copy replaced files along with an uninstall executable in an uninstall directory, and inform a user of its activities through a user interface.

The files 1008 include the binary files of the software version running on the target machine and stored on hard disk. In addition, the files 1008 may include the files of an update package from a multi-version software code base for installation and any files stored for uninstallation in an uninstall directory.

The Uninstaller 1012 may generally determine which files from the uninstall directory to restore back on the target machine, determine where to put those files on the target machine, and copy those files from the uninstall directory back to their former locations from which they were copied to the uninstall directory during installation of the update package. The Uninstaller 1012 may also generally verify that there is sufficient disk space for the uninstall procedure, clean up the copy of files from the uninstall directory after they have been restored, and inform a user of its activities through a user interface.

A user may initiate an uninstall procedure through a user interface by selecting a remove command made available for uninstalling an update package. When the remove command is selected for uninstalling an update package, the Migrator 1002 may be launched to perform reverse migration before launching the Uninstaller 1012 from the uninstall directory to re-install the binary files in that directory back into the appropriate locations on the target machine.

Figure 11:
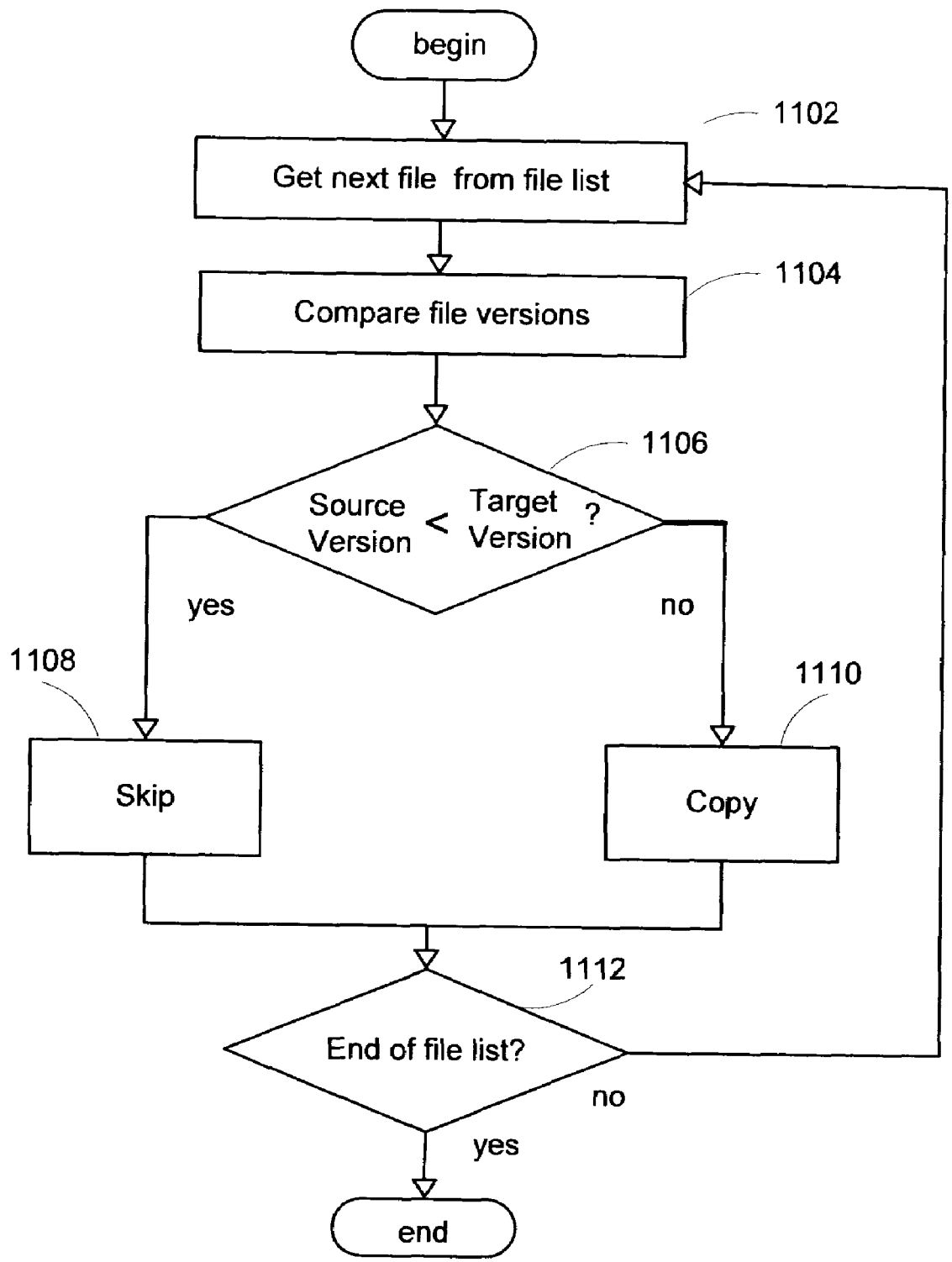
FIG. 11 is a flowchart generally representing the steps undertaken by the system for servicing software to analyze the files from an update package of a multi-version software code base for installation on a target machine, in accordance with an aspect of the present invention.

FIG. 11 is a flowchart generally representing the steps undertaken by the system for servicing software to analyze the files of an update package from a multi-version software code base for installation on a target machine. The analysis performed by the Installer 1006 for determining which files of the release version from the update package to put on the target machine may include skipping installation of a particular file and copying a particular file. Unlike the analysis performed by the Installer 506 for an update package from a multi-branch software code base, there is no need for comparing branch versions of files nor stepping up to higher branch versions during installation because an update package from a multi-version software code base does not contain branch versions.

The Installer 1006 gets the first file from the file list of installable files for that release version at step 1102. It next compares the source release version number of that file to the target release version number of that file at step 1104. Upon determining at step 1106 that the source release version number is less than that target release version number, the Installer proceeds to record at step 1108 to skip installing that source file on the target machine. If the Installer determined at step 1106 that the source release version number is not less than that target release version number, the Installer proceeds to record at step 1110 to install that source file by copying it on the target machine.

After recording to skip installation of that source file at step 1108 or recording to copy that source file at step 1110, the Installer checks at step 1112 if this was the last file in the file list of installable files for that release version. If this is the last file, then analysis is finished. If this is not the last file, the Installer gets the next file in the file list of installable files for that release version at step 1102, and analysis continues in this fashion until the list of installable files for that release version have been recorded for installation from the update package.

Uninstalling an updated version may occur as previously described in discussing FIG. 8. If the updated version is to be uninstalled, the Uninstaller for the multi-version embodiment may first reverse migrate any fixes that were migrated during installation of the update package and restore the previous path of the uninstall directory as it existed before that fix was migrated. Once any migrated fixes to the update package are uninstalled, the update package may then be uninstalled on the target machine.

As can be seen from the foregoing detailed description, there is provided an improved system and method for servicing software by installation of an updated version. As is now understood, the present invention provides branch versioning techniques that support multi-branch development and further provides release versioning techniques that support multi-version development. The branch versioning techniques described herein make possible multi-branch servicing, which simultaneously improves the stability of critical hotfixes and reduces test impact by greatly decreasing the likelihood that installation of a critical hotfix implies the installation of less-critical, less-tested fixes. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for servicing software in a computer system, comprising the steps of:

identifying an update package having at least two different versions of a fix for software installed on a target machine, wherein the different versions of the fix are for different versions of the software and the update package includes a version of the fix for a version of the software installed on the target machine;

selecting one of the at least two different versions of the fix for installation on the target machine based on the version of the software installed on the target machine; and persisting at the target machine at least one other version of the fix from the update package for automatic reinstallation on the target machine after future installation of a different version of the software on the target machine.

2. The method of claim 1 wherein selecting one of the at least two different versions comprises selecting one of at least two different release versions.

3. The method of claim 1 wherein selecting one of the at least two different versions comprises selecting one of at least two different branch versions.

4. The method of claim 1 further comprising a step of installing the selected one of the at least two different versions of the fix.

5. The method of claim 1 further comprising in response to a different version of the software being installed, a step of migrating a fix by installing at least one of the other versions of the fix persisted at the target machine.

6. The method of claim 1 further comprising a step of reverse migrating a fix, by uninstalling the fix prior to uninstalling the software from the target machine.

7. The method of claim 4 further comprising a step of uninstalling the one of the at least two different versions of the fix.

8. The method of claim 1 wherein selecting one of the at least two different versions of a fix comprises migrating a fix on the target system.

9. The method of claim 1 wherein selecting one of the at least two different versions of a fix comprises stepping up to a higher branch version than the initial branch version selected for installation.

10. The method of claim 1 wherein selecting one of the at least two different versions of a fix comprises comparing the release version of the updated binary file with a release version of the file on the target system.

11. The method of claim 7 wherein selecting one of the at least two different versions of a fix comprises comparing the branch version of the updated binary file with a branch version of the file on the target system.

12. A physical computer-readable medium having computer-executable instructions that when executed by a processor perform the following steps:

identifying an update package having at least two different versions of a fix for software installed on a target machine, wherein the different versions of the fix are for different versions of the software and the update package includes a version of the fix for a version of the software installed on the target machine;

selecting one of the at least two different versions of the fix for installation on the target machine based on the version of the software installed on the target machine; and persisting at the target machine at least one other version of the fix from the update package for automatic reinstallation on the target machine after future installation of a different version of the software on the target machine.

13. The computer-readable medium of claim 12 wherein selecting one of the at least two different versions comprises selecting one of at least two different release versions.

14. The computer-readable medium of claim 12 wherein selecting one of the at least two different versions comprises selecting one of at least two different branch versions.

15. The computer-readable medium of claim 12 further comprising a step of installing the selected one of the at least two different versions of the fix.

16. The computer-readable medium of claim 15 further comprising in response to a different version of the software being installed, a step of migrating a fix by installing at least one of the other versions of the fix persisted at the target machine.

17. The computer-readable medium of claim 12 further comprising a step of reverse migrating a fix, by uninstalling the fix prior to uninstalling software from the target machine.

18. The computer-readable medium of claim 15 further comprising a step of uninstalling the one of the at least two different versions of the fix.

19. The computer-readable medium of claim 12 wherein selecting one of the at least two different versions of a fix comprises migrating a fix on the target system.

20. The computer-readable medium of claim 12 wherein selecting one of the at least two different versions of the fix comprises stepping up to a higher branch version than the initial branch version selected for installation.

21. The computer-readable medium of claim 12 wherein the selecting one of the at least two different versions of the fix comprises comparing the release version of the updated binary file with a release version of the file on the target system.

22. The computer-readable medium of claim 12 wherein selecting one of the at least two different versions of the fix comprises comparing the branch version of the updated binary file with a branch version of the file on the target system.

23. A computer system comprising:

a processor;

a memory coupled to the processor, wherein the memory comprises computer executable instructions that when executed by the processor perform the following steps:

identifying an update package having at least two different versions of a fix for software installed on a target machine, wherein the different versions of the fix are for different versions of the software and the update package includes a version of the fix for a version of the software installed on the target machine;

selecting one of the at least two different versions of the fix for installation on the target machine based on the version of the software installed on the target machine; and persisting at the target machine at least one other version of the fix from the update package for automatic reinstallation on the target machine after future installation of a different version of the software on the target machine.

* * * * *